US011692884B2

(12) United States Patent
Cavanaugh et al.

(10) Patent No.: US 11,692,884 B2
(45) Date of Patent: Jul. 4, 2023

(54) THERMOWELL WITH PRESSURE SENSING CAPABILITIES (71) Applicant: Rosemount Inc., Shakopee, MN (US)

(72) Inventors: Jack M. Cavanaugh, Edina, MN (US); Nicholas E. Meyer, Chaska, MN (US); Andrew J. Wagener, Shorewood, MN (US); David M. Strei, Waconia, MN (US)

(73) Assignee: Rosemount Inc., Shakopee, MN (US)

( * ) Notice: Subject to any disclaimer, the term of this patent is extended or adjusted under 35 U.S.C. 154(b) by 0 days.

(21) Appl. No.: 16/995,113

(22) Filed: Aug. 17, 2020

(65) Prior Publication Data
US 2022/0049994 A1 Feb. 17, 2022

(51) Int. Cl.
G01K 13/02 (2021.01)
G01K 7/02 (2021.01)

(52) U.S. Cl.
CPC ............... G01K 13/02 (2013.01); G01K 7/02 (2013.01)

(58) Field of Classification Search
USPC ........................................ 374/208, 148, 143
See application file for complete search history.

(56) References Cited

U.S. PATENT DOCUMENTS 7,000,478 B1 2/2006 Zwollo et al.
7,111,982 B1 9/2006 Swonger, Jr.
(Continued)

FOREIGN PATENT DOCUMENTS

CN 209945608 U * 1/2020 ............ G01D 21/02
DE 10232315 B4 5/2009
(Continued)

OTHER PUBLICATIONS

Translation of WO2016052710A1 (Year: 2016).*
(Continued)

Primary Examiner — Mirellys Jagan
(74) Attorney, Agent, or Firm — Christopher R. Christenson; Kelly, Holt & Christenson, PLLC (57) ABSTRACT A process fluid multivariable measurement system is provided. The multivariable measurement system includes a thermowell configured to couple to a process fluid conduit and extend through a wall of the process fluid conduit. The multivariable measurement system also includes a temperature sensor assembly disposed within the thermowell, the temperature sensor assembly having at least one temperature sensitive element disposed therein. The multivariable measurement system also includes a pressure sensor assembly coupled to the thermowell, the pressure sensor assembly having at least one pressure sensitive element disposed therein. The multivariable measurement system further includes transmitter circuitry, communicatively coupled to the temperature sensor assembly and the pressure sensor assembly, configured to receive a temperature sensor signal from the at least one temperature sensitive element and responsively generate a temperature measurement output based on the temperature sensor signal. The transmitter circuitry is further configured to receive a pressure sensor signal from the at least one pressure sensitive element and responsively generate a pressure measurement output based on the pressure sensor signal.

16 Claims, 9 Drawing Sheets (56) References Cited

U.S. PATENT DOCUMENTS

| | | |
|---|---|---|
| 8,038,345 B2 | 10/2011 | Stoll et al. |
| 10,371,000 B1 | 8/2019 | Graham |
| 2004/0024572 A1* | 2/2004 | Pagnano ............ G05B 19/0425 |
| | | 702/188 |
| 2007/0186659 A1 | 8/2007 | Engelhardt et al. |
| 2008/0072877 A1* | 3/2008 | Kurtz .................. G01L 19/0092 |
| | | 123/406.55 |
| 2009/0178487 A1* | 7/2009 | Girroir ................ G01L 19/0092 |
| | | 73/716 |
| 2013/0243032 A1* | 9/2013 | Arunasalam ......... G01K 15/005 |
| | | 374/E1.001 |
| 2014/0150540 A1* | 6/2014 | Lenferink ................ G01K 1/14 |
| | | 73/114.01 |
| 2017/0131150 A1 | 5/2017 | Thies et al. |
| 2018/0073950 A1* | 3/2018 | Bae ..................... G01L 19/0038 |

FOREIGN PATENT DOCUMENTS

| | | | | |
|---|---|---|---|---|
| DE | 102014211771 A1 | * | 12/2015 | ......... F02M 35/1038 |
| KR | 20180066744 A | * | 6/2018 | |
| WO | WO-2016052710 A1 | * | 4/2016 | ............. G01K 13/02 |
| WO | WO-2021110433 A1 | * | 6/2021 | ............. G01K 7/028 |

OTHER PUBLICATIONS

International Search Report and Written Opinion dated Oct. 25, 2021, for International Patent Application No. PCT/US2021/041981. 14 pages.

\* cited by examiner

THERMOWELL WITH PRESSURE SENSING CAPABILITIES

BACKGROUND

Many industrial processes convey process fluids through pipes or other conduits. Such process fluids can include liquids, gasses, and sometimes entrained solids. These process fluids may be found in any of a variety of industries including, without limitation, hygienic food and beverage production, water treatment, high-purity pharmaceutical manufacturing, chemical processing, the hydrocarbon fuel industry, including hydrocarbon extraction and processing as well as hydraulic fracturing techniques utilizing abrasive and corrosive slurries.

Industrial process transmitters and sensor assemblies are used to sense characteristics of process fluids flowing through a conduit or contained within a vessel, and to transmit information about those process characteristics to a control, monitoring and/or safety system remotely located from the process measurement location. Process transmitters are typically electrically connected to sensor assemblies via sensor wires used to transmit current- or voltage-based analog sensor output signals reflecting a process parameter. Each transmitter reads these sensor output signals and converts them into measurement of the process parameter. Finally, the transmitter sends the information to the control system.

It is common to place a temperature sensor within a thermowell, which is then inserted into the process fluid flow through an aperture in the conduit. In a typical industrial process environment, the ability to add additional measurement points for obtaining measurements of different process characteristics is difficult due to the complex nature of the process environment. For example, in order to measure different process characteristics in a typical industrial process environment, significant altering of the process environment infrastructure would typically have to occur, along with significant financial cost to change the process environment infrastructure. Accordingly, the use of thermowells in an industrial process environment, while useful for providing accurate process fluid temperatures, have a number of limitations.

SUMMARY

A process fluid multivariable measurement system is provided. The multivariable measurement system includes a thermowell configured to couple to a process fluid conduit and extend through a wall of the process fluid conduit. The multivariable measurement system also includes a temperature sensor assembly disposed within the thermowell, the temperature sensor assembly having at least one temperature sensitive element disposed therein. The multivariable measurement system also includes a pressure sensor assembly coupled to the thermowell, the pressure sensor assembly having at least one pressure sensitive element disposed therein. The multivariable measurement system further includes transmitter circuitry, communicatively coupled to the temperature sensor assembly and the pressure sensor assembly, configured to receive a temperature sensor signal from the at least one temperature sensitive element and responsively generate a temperature measurement output based on the temperature sensor signal. The transmitter circuitry is further configured to receive a pressure sensor signal from the at least one pressure sensitive element and responsively generate a pressure measurement output based on the pressure sensor signal.

DETAILED DESCRIPTION OF ILLUSTRATIVE EMBODIMENTS

As set forth above, it is difficult to add additional measurement points for obtaining measurements of different process characteristics due to the complex nature of the industrial process environment. For example, to add a system that is capable of detecting pressure in an industrial process environment, significant intrusion and modification of the process environment infrastructure would typically have to occur, such as creating a new access point within the infrastructure for measurement of the new process characteristic. Additionally, such a modification is difficult due to the high temperature conditions that exist within the conduits of the industrial process environment.

Figure 1:
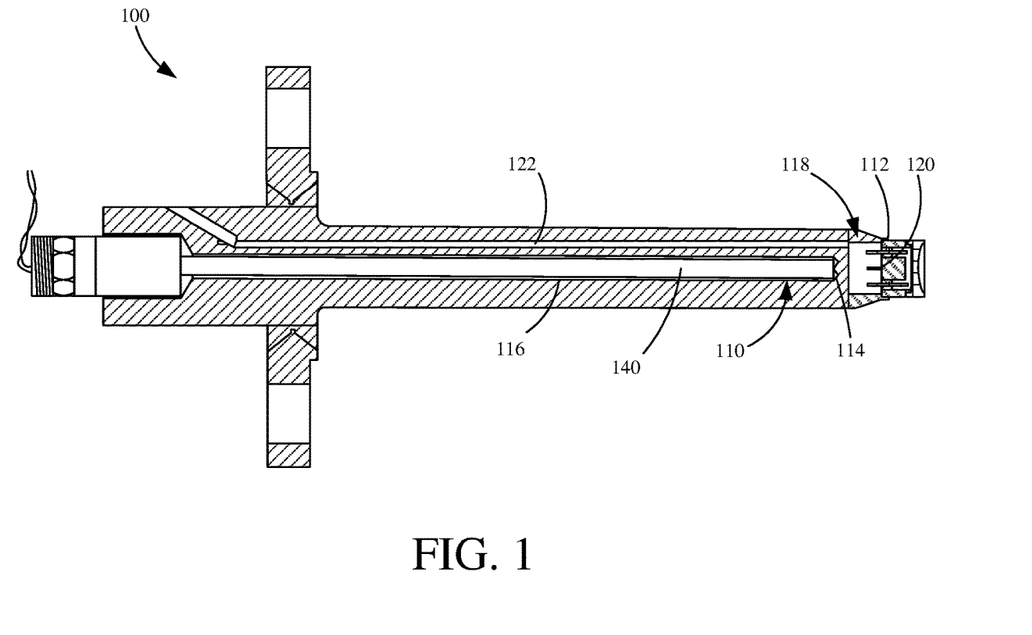
FIG. 1 is a diagrammatic view of a multivariable thermowell for implementation in a process fluid multivariable measurement system with which embodiments of the present invention are particularly applicable.

FIG. 1 is a diagrammatic view of a multivariable thermowell for implementation in a process fluid multivariable measurement system with which embodiments of the present invention are particularly applicable. As illustrated, thermowell 100 is configured to couple to a process fluid conduit (such as the process fluid conduit described in FIGS. 5A-5B) and extend through a wall of the process fluid conduit. Thermowell 100 is further configured to generally contact process fluid within the process fluid conduit in order to obtain measurements of the process fluid, such as temperature and/or pressure. In one embodiment, thermowell 100 is a threaded thermowell. However, in other embodiments, thermowell 100 may be a flanged thermowell or other thermowell design capable of coupling to the process fluid conduit. Thermowell 100 further includes temperature sensor assembly 110 generally disposed therein and a sensor capsule 112. The term "capsule" is not intended to imply any particular structure or shape and can thus be formed in a variety of shapes, sizes and configurations. Temperature sensor assembly 110 generally includes one or more temperature sensitive elements 114, such as resistance temperature devices (RTDs). Temperature sensitive element 114 is electrically connected to transmitter circuitry (not shown) via access hole 116 and is configured to obtain one or more temperature measurements. Access hole 116 is generally configured to allow coupling 140 of the temperature sensor assembly therethrough. Sensor capsule 112 may be electrically connected to transmitter circuitry via a transmission loop, a fiber optic cable, a wireless link or some other connection.

Thermowell 100 also includes pressure sensor assembly 118 generally disposed within thermowell 100 and comprising one or more pressure sensitive elements 120 disposed therein configured to obtain one or more pressure measurements. In one embodiment, pressure sensor assembly 118 comprises a strain-gauge sensor. In another embodiment, pressure sensor assembly 118 may comprise a capacitive pressure sensor. Of course, in other embodiments pressure sensor assembly 118 may comprise a different type of pressure sensor, such as a potentiometer sensor, resonant wire sensor, or other pressure sensor capable of obtaining pressure measurements. Additionally, in one embodiment, pressure sensor assembly 118 may comprise a multivariable sensor, such as that described below in FIG. 8, configured to simultaneously obtain both pressure and temperature measurements in the process fluid multivariable measurement system and responsively generate temperature and pressure sensor signals. By incorporating a multivariable sensor into pressure sensor assembly 118, an additional temperature measurement may be obtained. The additional temperature measurement obtained by the multivariable sensor provides an alternative mode of measuring temperature should any instrumental error occur. For example, the redundant temperature measurements obtained by both the multivariable sensor and temperature sensor assembly 110 may provide a backup temperature measurement if the other should fail.

Pressure sensitive element 120 may, in one embodiment, be disposed within sensor capsule 112. However, in alternative embodiments, pressure sensitive element 120 may be disposed outside of sensor capsule 112. Pressure sensitive element 120 is electrically connected to transmitter circuitry (not shown) via access hole 122, the access hole being configured to allow coupling (not shown) of pressure sensor assembly 118 therethrough. As illustrated, access hole 122 is disposed adjacent to temperature sensor assembly 110 and is disposed generally within a wall of thermowell 100. In particular, access hole 122 is disposed separate from and adjacent to access hole 116. As further illustrated, access hole 122 is parallel to temperature sensor assembly 110. However, in alternative embodiments, access hole 122 may be disposed proximate temperature sensor assembly 110 in other fashions that allow coupling of pressure sensitive element 120 to the transmitter circuitry.

Access hole 122 may be incorporated into the wall of thermowell 100 in a number of ways. For example, access hole 122 may be incorporated by utilizing EDM machining or gun-bore drilling technology. The incorporation of access hole 122 into thermowell 100 allows for the addition of pressure sensor assembly 118 without significant alteration of the process environment infrastructure.

Figure 2:
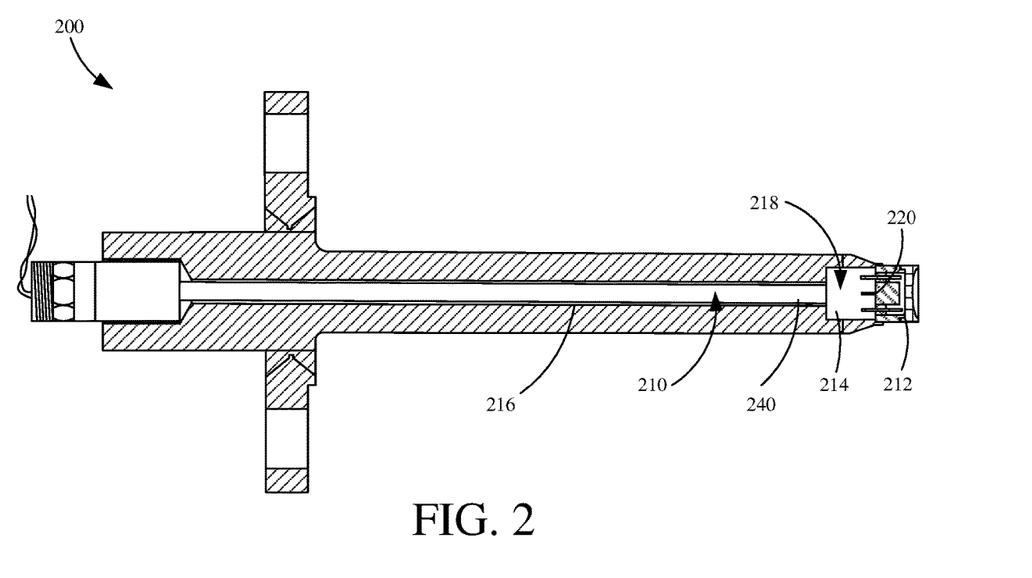
FIG. 2 is a diagrammatic view of a multivariable thermowell for implementation in a process fluid multivariable measurement system in accordance with another embodiment of the present invention.

FIG. 2 is a diagrammatic view of a multivariable thermowell for implementation in a process fluid multivariable measurement system in accordance with another embodiment of the present invention. The system illustrated in FIG. 2 bears some similarities to FIG. 1 and like components are numbered similarly. As illustrated, thermowell 200 is configured to couple to a process fluid conduit, such as the process fluid conduit described in FIGS. 5A-5B, and extend through a wall of the process fluid conduit. Thermowell 200 is further configured to generally contact process fluid within the process fluid conduit in order to obtain measurements of the process fluid, such as temperature and/or pressure. In one embodiment, thermowell 200 is a threaded thermowell. However, in other embodiments, thermowell 200 may be a flanged thermowell or other thermowell design capable of coupling to the process fluid conduit.

Thermowell 200 further includes temperature sensor assembly 210 and pressure sensor assembly 218 generally disposed therein and a sensor capsule 212. Sensor capsule 212 generally includes one or more temperature sensitive elements 214 and/or one or more pressure sensitive elements 220. In one embodiment, temperature sensor assembly 210 and/or pressure sensor assembly 218 may comprise a strain-gauge sensor. However, in other embodiments, a different type of pressure sensor may be utilized (e.g., a capacitive pressure sensor). Additionally, in one embodiment, pressure sensor assembly 218 may comprise a multivariable sensor, such as that described below in FIG. 8, configured to simultaneously obtain both pressure and temperature measurements in the process fluid multivariable measurement system. By incorporating a multivariable sensor into pressure sensor assembly 218, an additional temperature measurement may be obtained.

Temperature sensitive element 214 and pressure sensitive element 220 are electrically connected to transmitter circuitry (not shown) via access hole 216 and are configured to obtain one or more temperature measurements and/or one or more pressure measurements. Access hole 216 is generally configured to allow coupling 240 of the temperature sensor assembly 210 and pressure sensor assembly 218 therethrough. Temperature sensitive element 214 and pressure sensitive element 220 may be electrically connected to transmitter circuitry via a transmission loop, a fiber optic cable, a wireless link or some other connection. As shown in FIG. 2, in one embodiment, pressure sensor assembly 218 shares the same access hole 216 as temperature sensor assembly 210. By incorporating pressure sensor assembly 218 within the same access hole 216 as temperature sensor assembly 210, no additional modifications to thermowell 200 need to occur, such as the addition of an additional access holes. For instance, in thermowell embodiments where thermowell wall thickness is limited, leveraging the same access hole as temperature sensor assembly 210 for pressure sensor assembly 218 allows for multivariable sensing of process fluid characteristics. In one embodiment, pressure sensitive element 220 is incorporated to an end of sensor capsule 212 by boring the tip of thermowell 200 to allow for the pressure sensitive element to be coupled to sensor capsule 212, such as by welding.

Figure 3:
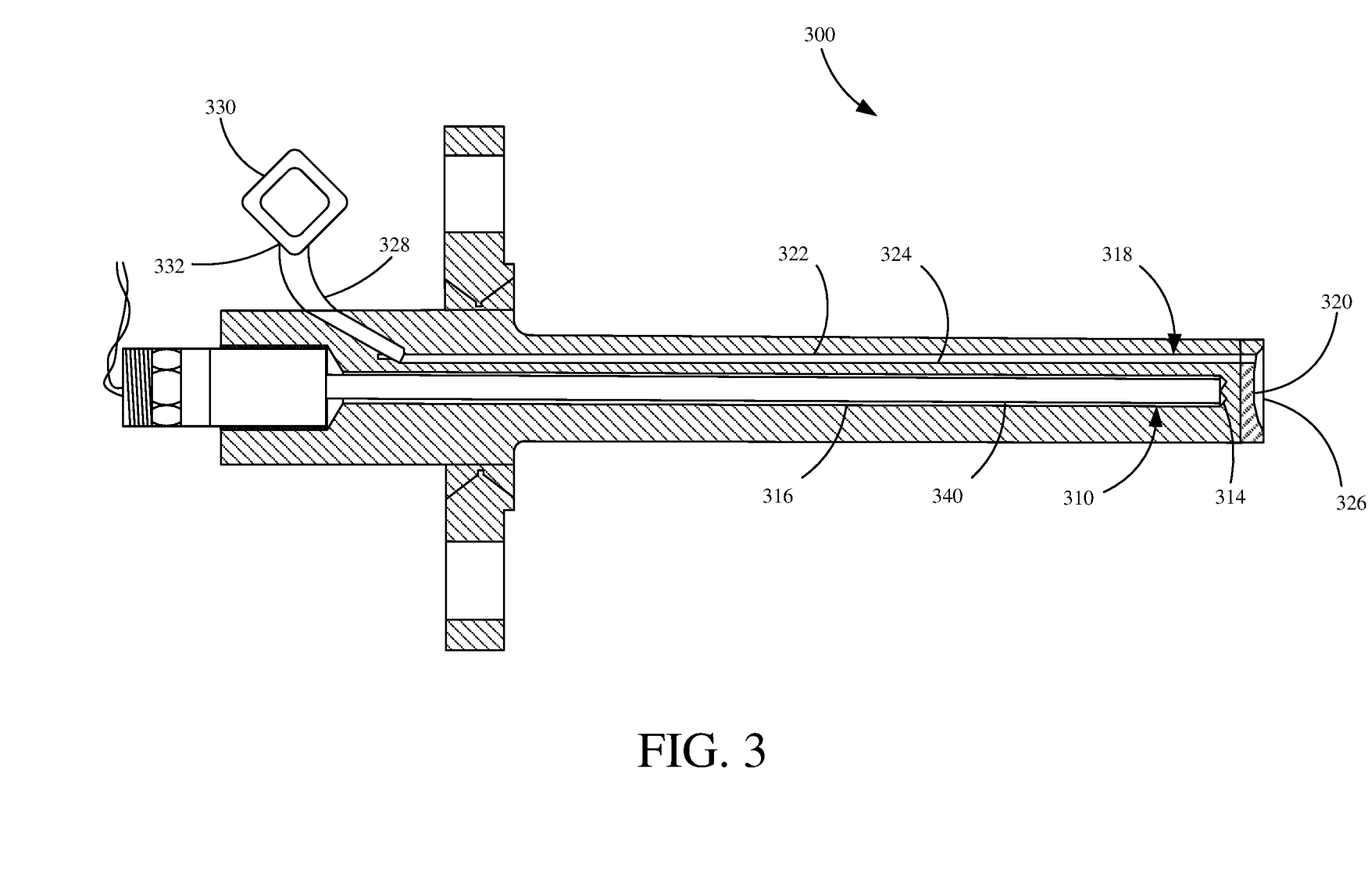
FIG. 3 is a diagrammatic view of a multivariable thermowell for implementation in a process fluid multivariable measurement system in accordance with an embodiment of the present invention.

FIG. 3 is a diagrammatic view of a multivariable thermowell for implementation in a process fluid multivariable measurement system in accordance with an embodiment of the present invention. The system illustrated in FIG. 3 bears some similarities to FIGS. 1 and 2, and like components are numbered similarly. As illustrated, thermowell 300 is configured to couple to a process fluid conduit, such as the process fluid conduit described in FIGS. 5A-5B and extend through a wall of the process fluid conduit. Thermowell 300 is further configured to generally contact process fluid within the process fluid conduit in order to obtain measurements of the process fluid, such as temperature and/or pressure. In one embodiment, thermowell 300 is a threaded thermowell. However, in other embodiments, thermowell 300 may be a flanged thermowell or other thermowell design capable of coupling to the process fluid conduit. Thermowell 300 further includes temperature sensor assembly 310 generally disposed within thermowell 300. Temperature sensor assembly 310 generally includes one or more temperature sensitive elements 314, such as resistance temperature devices (RTDs). Temperature sensitive element 314 is electrically connected to transmitter circuitry (not shown) via access hole 316 and is configured to obtain one or more temperature measurements. Access hole 316 is generally configured to allow coupling 340 of the temperature sensor assembly therethrough. Temperature sensor assembly 310 may be electrically connected to transmitter circuitry via a transmission loop, a fiber optic cable, a wireless link or some other connection.

Thermowell 300 also includes pressure sensor assembly 318 generally disposed within thermowell 300 and comprising one or more pressure sensitive elements 320 disposed therein. As illustrated, pressure sensor assembly 318 further includes access hole 322. In one embodiment, access hole 322 is filled with a pressure transmitting substance 324 and pressure sensitive element 320 comprises a membrane 326 that fluidically couples the process fluid within the process fluid conduit to the pressure transmitting substance 324. Pressure transmitting substance 324 may be, for example, an oil. However, in other embodiments, pressure transmitting substance 324 may be another fluid capable of transmitting indications of pressure. Access hole 322 further includes tubing 328 which allows pressure transmitting substance 324 to couple to a pressure sensor 330 via a pressure deflecting diaphragm, indicated generally at 332. Pressure deflecting diaphragm may be, for example, a thin film diaphragm, a corrugated diaphragm, or other diaphragm capable of coupling pressure sensor 330 to pressure transmitting substance 324. Accordingly, as illustrated, pressure sensor 330 may be disposed remotely from the thermowell and may generate a pressure sensor signal via pressure indications transmitted through pressure transmitting substance 324 in access hole 322, which is then received by transmitter circuitry (not shown). This prevents harsh process conditions, such as higher temperature processes, from interfering with pressure sensing capabilities of multivariable thermowell 300.

Figure 4:
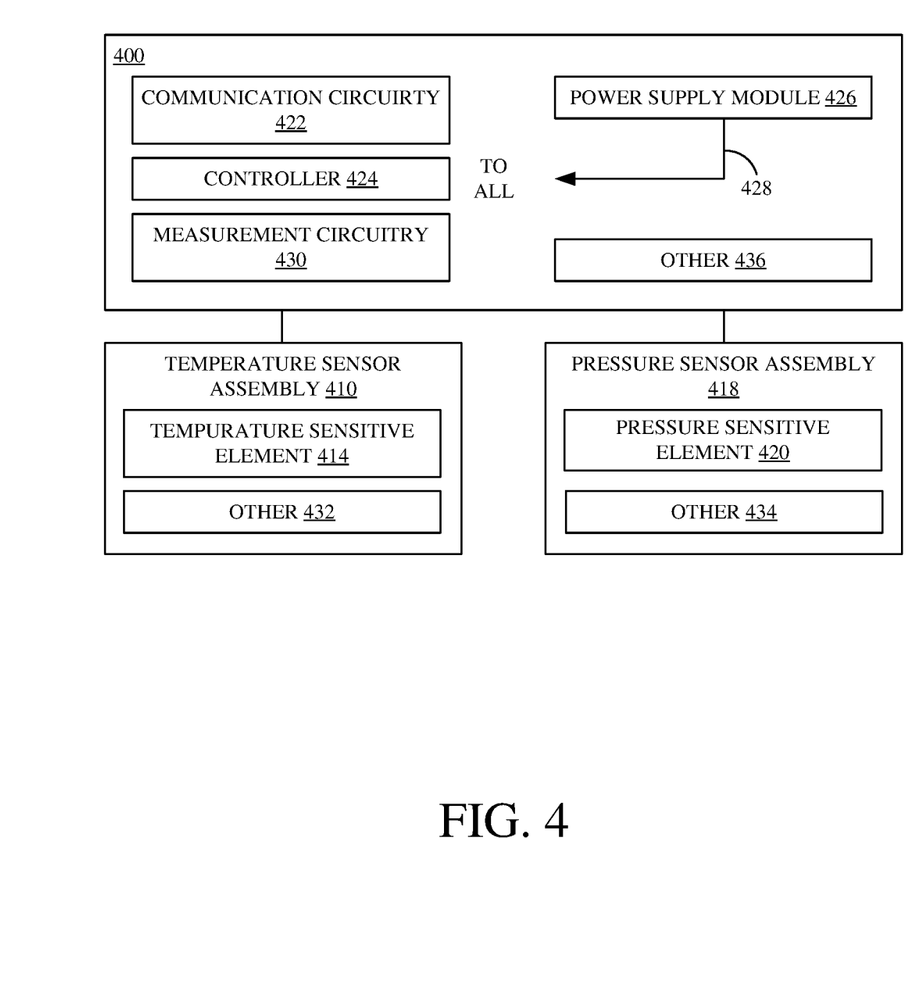
FIG. 4 is a block diagram of circuitry of a process fluid multivariable measurement system, with which embodiments of the present invention are particularly applicable.

FIG. 4 is a block diagram of circuitry of a process fluid multivariable measurement system, with which embodiments of the present invention are particularly applicable. System 400 bears some similarities to elements of the multivariable thermowell described in FIGS. 1-3, and like components are numbered similarly. System 400 can also include other items as well, as indicated by block 436. System 400 includes communication circuitry 422 coupled to controller 424. Communication circuitry 422 can be any suitable circuitry that is able to convey information regarding the process fluid temperature and/or pressure obtained with the multivariable thermowell, such as those described in FIGS. 1-3 and 9. Communication circuitry 422 allows the multivariable thermowell disposed in a process fluid multivariable measurement system to communicate a process fluid temperature and/or pressure output over a process communication loop or segment, such as a transmission loop. Suitable examples of process communication loop protocols include the 4-20 milliamp protocol, Highway Addressable Remote Transducer (HART®) protocol, FOUNDATION™ Fieldbus Protocol, and the WirelessHART protocol (IEC 62591).

System 400 also includes power supply module 426 that provides power to all components of system 400 as indicated by arrow 428. In embodiments where system 400 is coupled to a wired process communication loop, such as a HART® loop or FOUNDATION™ Fieldbus segment, power module 426 may include suitable circuitry to condition power received from the loop or segment to operate the various components of system 400. Accordingly, in such wired process communication loop embodiments, power supply module 426 may provide suitable power conditioning to allow the entire device to be powered by the loop to which it is coupled. In other embodiments, when wireless process communication is used, power supply module 426 may include a source of power, such as a battery and suitable conditioning circuitry.

Controller 424 is communicatively coupled to communication circuitry 422 and includes any suitable arrangement that is able to generate a heat-flow based process fluid temperature output and process fluid pressure output using measurements from temperature sensor assembly 410 and pressure sensor assembly 418. For example, controller 424 may receive a temperature sensor signal from temperature sensitive element 414 within temperature sensor assembly 410 and responsively generate a temperature measurement output based on the temperature sensor signal. Alternatively, or additionally, controller 424 may receive a pressure sensor signal from pressure sensitive element 420 within pressure sensor assembly 418 and responsively generate a pressure measurement output based on the pressure sensor signal. The output may be provided to an operator, machine, or other device. Additionally, the output may be a visual output, auditory output, or other output capable of indicating temperature and/or pressure measurements within the process fluid multivariable measurement system. In one example, controller 424 is a microprocessor.

Measurement circuitry 430 is coupled to controller 424 and provides digital indications with respect to measurements obtained from temperature sensor assembly 410 and pressure sensor assembly 418. Measurement circuitry 430 can include one or more analog-to-digital converters and/or suitable multiplexing circuitry to interface the one or more analog-to-digital converters to temperature sensor assembly 410 and pressure sensor assembly 418. Additionally, measurement circuitry 430 can include suitable amplification and/or linearization circuitry as may be appropriate for the various types of sensors employed.

Temperature sensor assembly 410 illustratively includes temperature sensitive element 414 and can include other items as well, as indicated by block 432. One example of such an other item is a vibration sensor. Temperature sensitive element 414 is coupled to the electronic circuitry of system 400 via an access hole (not shown) and is used to produce a temperature sensor signal indicative of temperature of the process fluid within the process fluid multivariable measurement system. Pressure sensor assembly 418 illustratively includes pressure sensitive element 420 and can include other items as well, as indicated by block 434. An example of an other item is a vibration sensor. Pressure sensitive element 420 is coupled to the electronic circuitry of system 400 via an access hole (not shown) and is used to produce a pressure sensor signal indicative of pressure of the process fluid multivariable measurement system. In one embodiment, pressure sensitive element 420 is coupled to the electronic circuitry of system 400 via the same access hole as temperature sensitive element. In other embodiments, however, pressure sensitive element utilizes an additional access hole separate from the access hole utilized in temperature sensor assembly 410. For example, the access hole may be disposed adjacent to the temperature sensor assembly, disposed parallel to the temperature sensor assembly, or disposed within the wall of the thermowell in another manner.

Figure 5A:
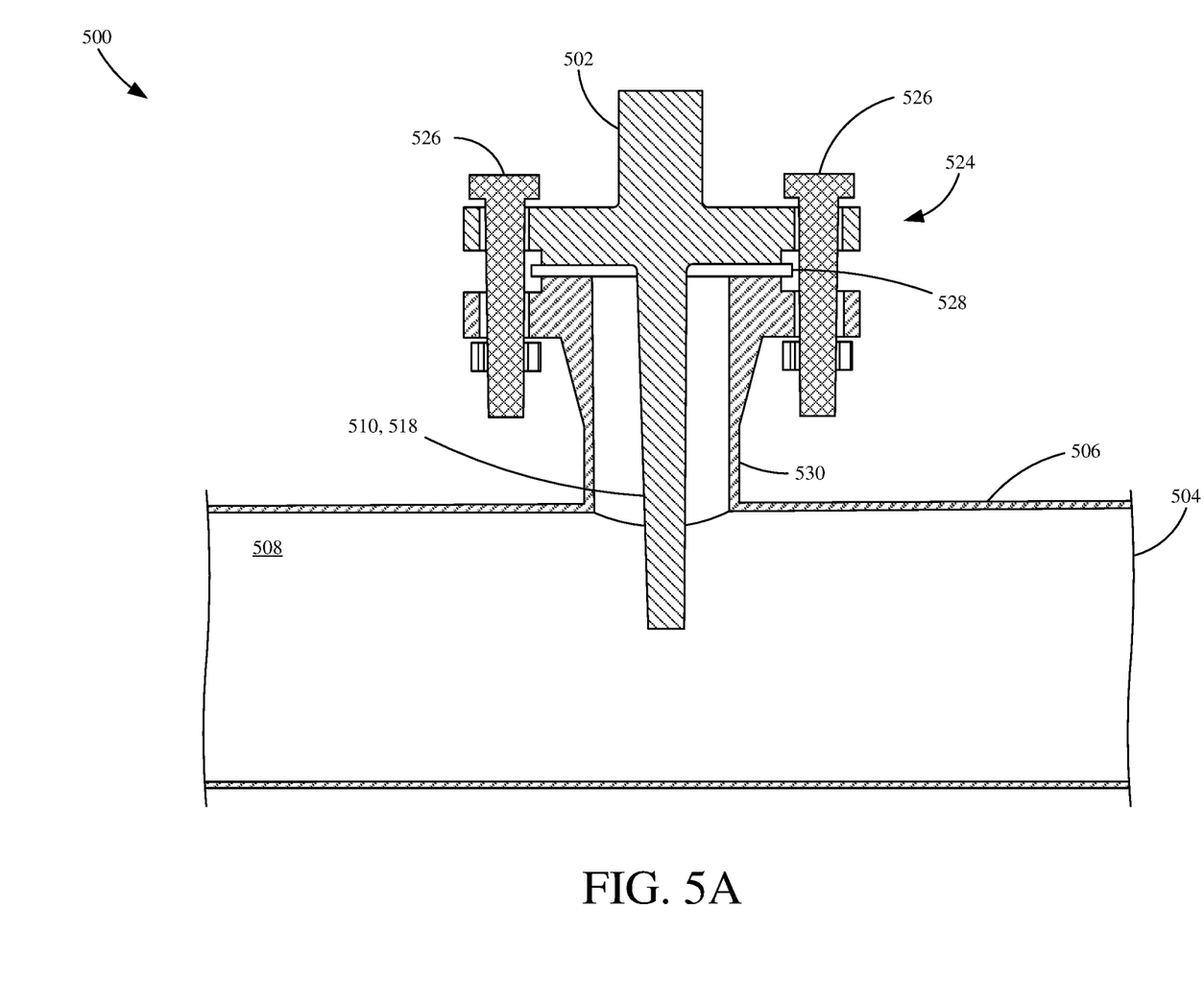
FIGS. 5A-5B are diagrammatic views of a process fluid multivariable measurement system with which embodiments of the present inventions are particularly applicable.
Figure 5B:
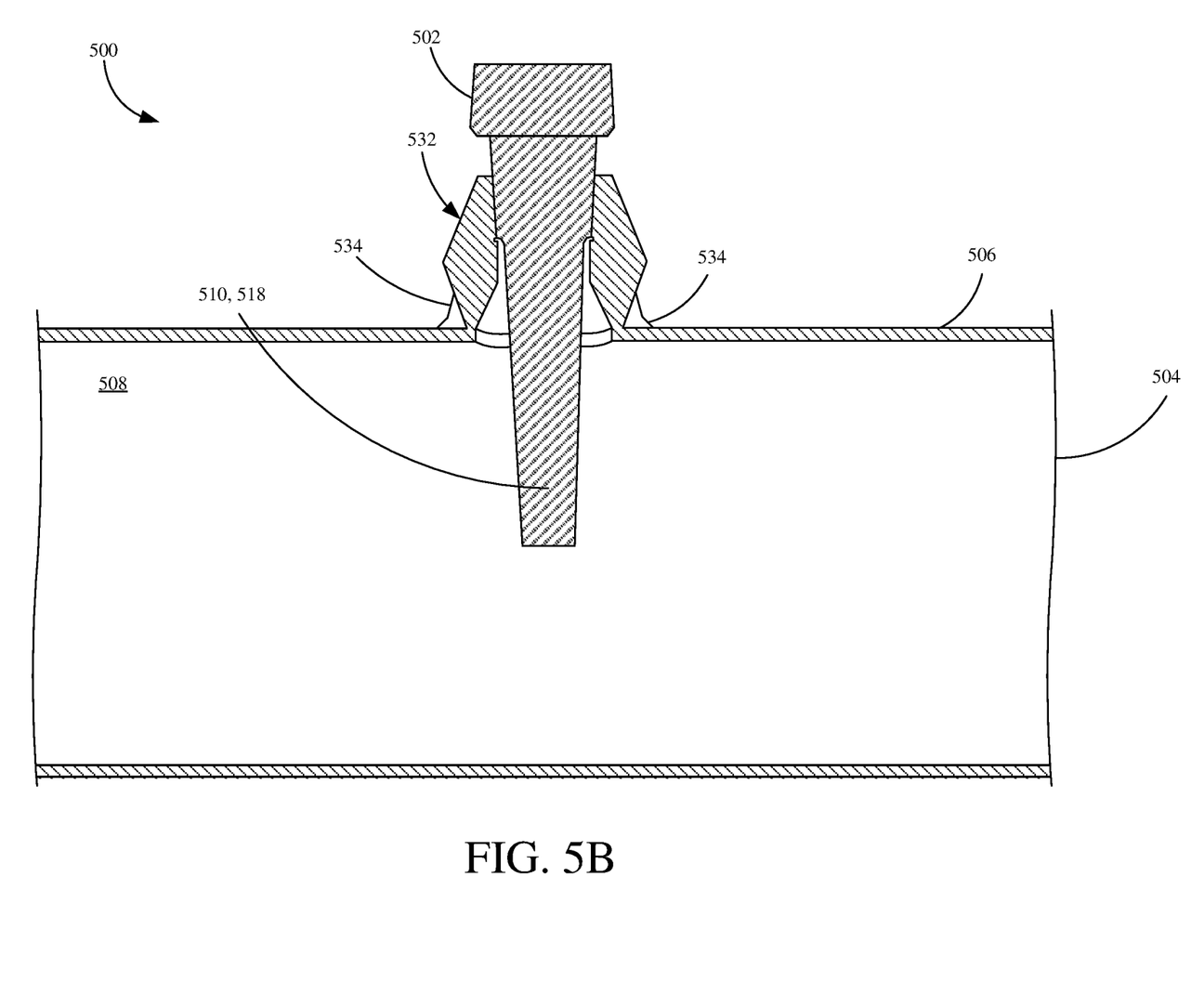

FIGS. 5A-5B are diagrammatic views of a process fluid multivariable measurement system with which embodiments of the present inventions are particularly applicable. The system illustrated in FIG. 5A bears some similarities to FIG. 5B and like components are numbered similarly. As illustrated, system 500 generally includes a thermowell 502 configured to couple to a process fluid conduit 504 and extend through a wall 506 of the process fluid conduit. Thermowell 502 is further configured to contact process fluid 508 within process fluid conduit 504 in order to obtain measurements of the process fluid, such as temperature and/or pressure. Thermowell 502 further includes temperature sensor assembly 510 generally disposed within thermowell 502 and includes a sensor capsule, further illustrated in FIGS. 1-3. System 500 generally includes one or more temperature sensitive elements (not shown) disposed within thermowell 502, such as temperature sensitive element 114 described above with regard to FIG. 1. Temperature sensitive elements are electrically connected to transmitter circuitry, illustrated in FIG. 4, which is configured to obtain one or more temperature measurements.

Process fluid multivariable measurement system 500 also includes pressure sensor assembly 518 coupled to thermowell 502. Pressure sensor assembly 518 typically has one or more pressure sensitive elements (not shown) disposed therein, such as pressure sensitive element 120 described above with regard to FIG. 1. When in contact with process fluid 508 within process fluid conduit 504, Temperature sensor assembly and pressure sensor assembly are configured to, respectively, generate a temperature sensor signal and/or a pressure sensor signal using the temperature sensitive element and pressure sensitive element disposed within thermowell 502 to be sent to transmitter circuitry. The transmitter circuitry, such as that described above with regard to FIG. 4, receives the temperature sensor signal and/or pressure sensor signal and responsively generates a temperature measurement output and/or pressure measurement output based on the received signals. The outputs are generally indicative of the temperature and/or pressure of the process fluid 508 within the process fluid conduit 504. Alternatively, or additionally, the outputs may be indicative of the temperature and/or pressure of the environment within process fluid conduit 504.

As illustrated in FIG. 5A, thermowell 502 comprises a flanged fitting. However, in FIG. 5B, thermowell 502 comprises a threaded fitting. As illustrated in FIG. 5A, flanged fitting 524 generally includes bolts 526 configured to couple thermowell 502 to nozzle 530 of process fluid conduit 504. Flanged fitting 524 further includes sealing ring 528 configured to prevent process fluid flow therethrough. Sealing ring 528 may be an O-ring seal, or any other seal capable of sealing process fluid 508 into process fluid conduit 504.

As illustrated in FIG. 5B, thermowell 502 may alternatively comprise threaded fitting 532 configured to couple to threads on thermowell 502 (not shown) in order to bind thermowell 502 to process fluid conduit 504. Threaded fitting 532 includes weld 534, which is configured to couple threaded fitting 532 to the wall 506 of the process fluid conduit 504. By utilizing a multivariable thermowell in either threaded or flanged embodiments, this allows for a variety of thermowell installations within a process fluid environment to be enabled with temperature and/or pressure sensing capabilities.

Figure 6:
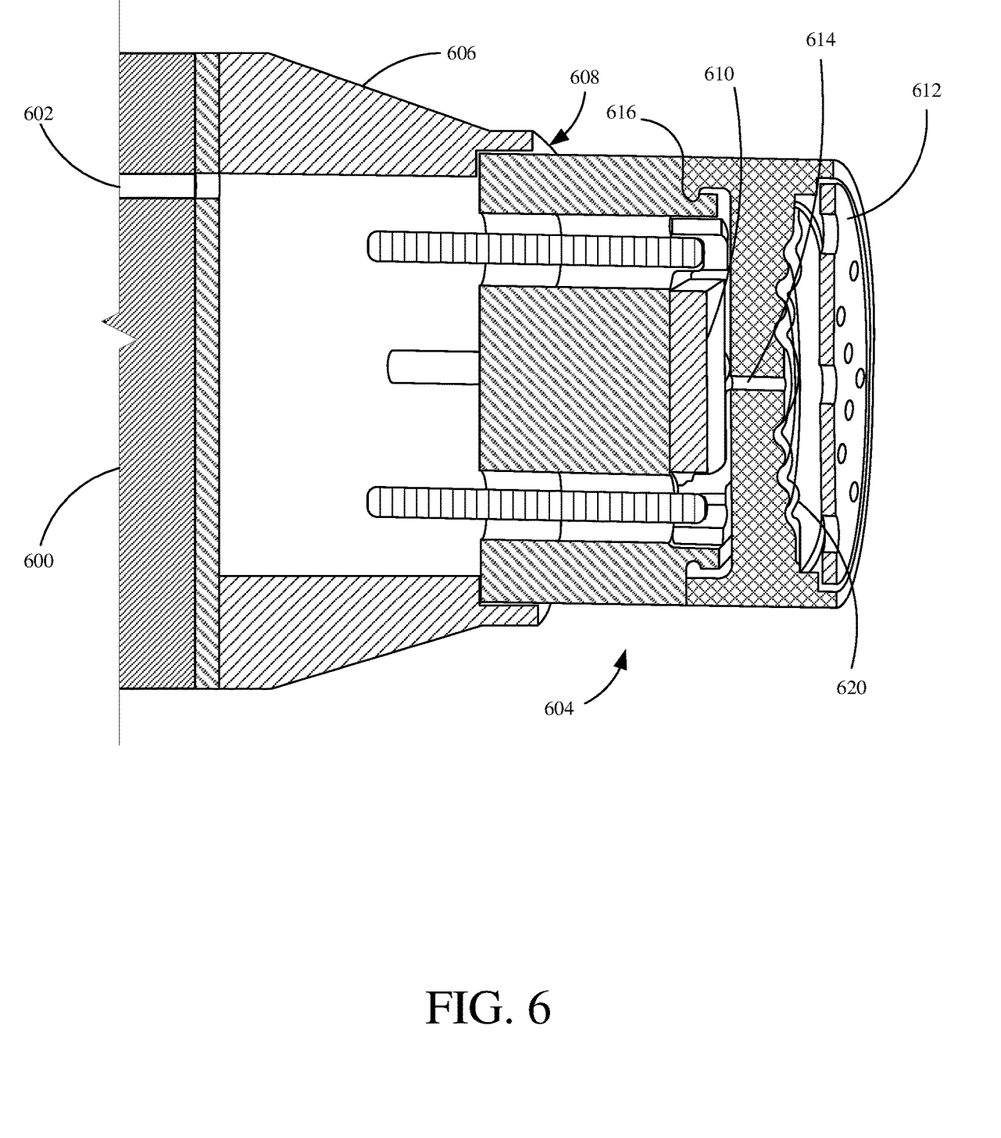
FIG. 6 is a diagrammatic view of a multivariable thermowell having a strain-gauge pressure sensor in accordance with an embodiment of the present invention.

FIG. 6 is a diagrammatic view of a multivariable thermowell having a strain-gauge pressure sensor in accordance with an embodiment of the present invention Thermowell body 600 generally includes access hole 602 disposed within the thermowell body and configured to allow coupling of the pressure sensor assembly therethrough. Thermowell body 600 further includes strain-gauge sensor 604 configured to generate a pressure sensor signal in response to detected pressure within the process fluid conduit. Strain-gauge sensor includes adapting collar 606, the adapting collar being configured to couple strain-gauge sensor 604 to thermowell body 600. Strain-gauge sensor 604 is coupled to adapting collar 606 at coupling mechanism 608. Coupling mechanism 608 may be, for example, a weld that joins adapting collar 606 to strain-gauge sensor 604.

Strain-gauge sensor 604 further includes pressure sensor element 610, which is configured to detect pressure of the process fluid conduit and produce a pressure signal indicative of the detected pressure. In one embodiment, strain-gauge sensor 604 further comprises a pressure transmitting substance generally disposed in channel 614. The pressure transmitting substance is fluidically isolated from the process fluid by isolation diaphragm 620 and conveys indications of pressure to pressure sensor element 610. In this way, pressure indications may be transmitted through the pressure transmitting substance from the process fluid and to pressure sensor element 610 in order to responsively generate a pressure sensor signal. The pressure transmitting substance may be, for example, an oil. However, in other embodiments, the pressure transmitting substance may be another fluid capable of transmitting indications of pressure.

Isolation diaphragm 620 is coupled to pressure sensor 604 via latching point 616, and is configured to isolate the process fluid from the pressure transmitting substance and pressure sensor element 610. In one embodiment, latching point 616 is a weld. Strain-gauge sensor 604 additionally includes screen 612. By incorporating screen 612 at the tip of strain-gauge sensor 604, the strain-gauge sensor may be encapsulated and protected from passing debris while also being limited from wake frequency. In other words, flow characteristics are optimized which in turn may improve pressure and/or temperature measurement.

Figure 7:
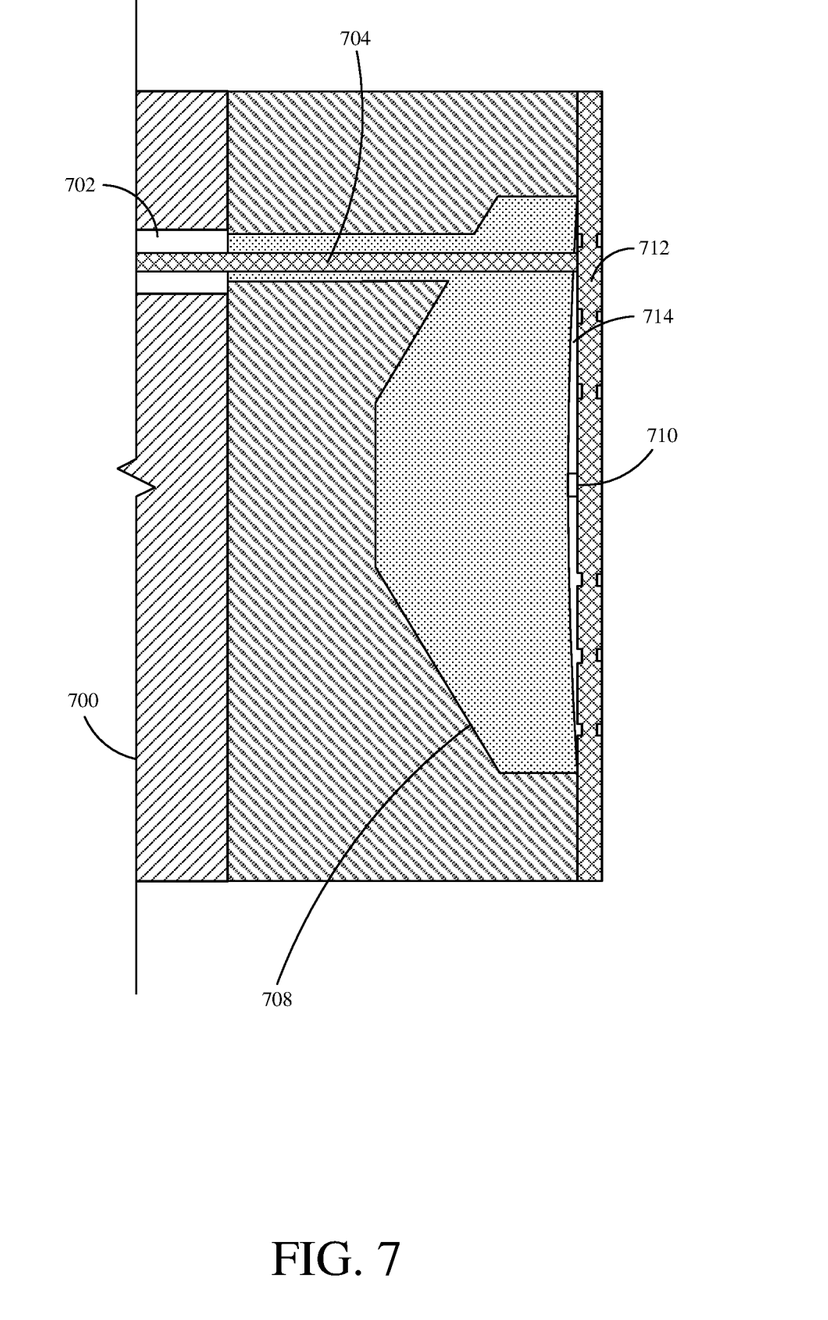
FIG. 7 is a diagrammatic view of a multivariable thermowell having a capacitive pressure sensor in accordance with an embodiment of the present invention.

FIG. 7 is a diagrammatic view of a sensor capsule in a multivariable thermowell having a capacitive pressure sensor in accordance with an embodiment of the present invention. Thermowell body 700 generally includes access hole 702 configured to allow coupling 704 of the pressure sensor assembly therethrough. As shown, coupling 704 comprises a cable wire. However, in other embodiments, coupling 704 may be a pressure transmitting substance, a two-or-more wire cable, or a wireless link. Thermowell body 700 further includes capacitive pressure sensor 714 configured to generate a pressure sensor signal in response to detected pressure within the process fluid conduit. By utilizing a capacitive pressure sensor assembly, coupling of the pressure sensor assembly may be disposed in a variety of locations within thermowell body 700, such as in access hole 702.

Capacitive pressure sensor 714 further includes capacitance plate 708 disposed near an end of the thermowell configured to couple to process fluid within a process fluid conduit. Capacitance plate 708 includes, in one embodiment, electrode 710 and pressure deflecting diaphragm 712 configured to produce and transmit indications of pressure within the process fluid conduit. In one embodiment, capacitance plate 708 is formed of a glass material. In this way, a vacuum may be formed in cavity 714 between pressure deflecting diaphragm 712 and electrode 710 in order to allow for the production and transmission of pressure indications. In one embodiment, pressure deflecting diaphragm 712 is a corrugated diaphragm. However, in other embodiments, pressure deflecting diaphragm 712 may be a thin film diaphragm.

Figure 8:
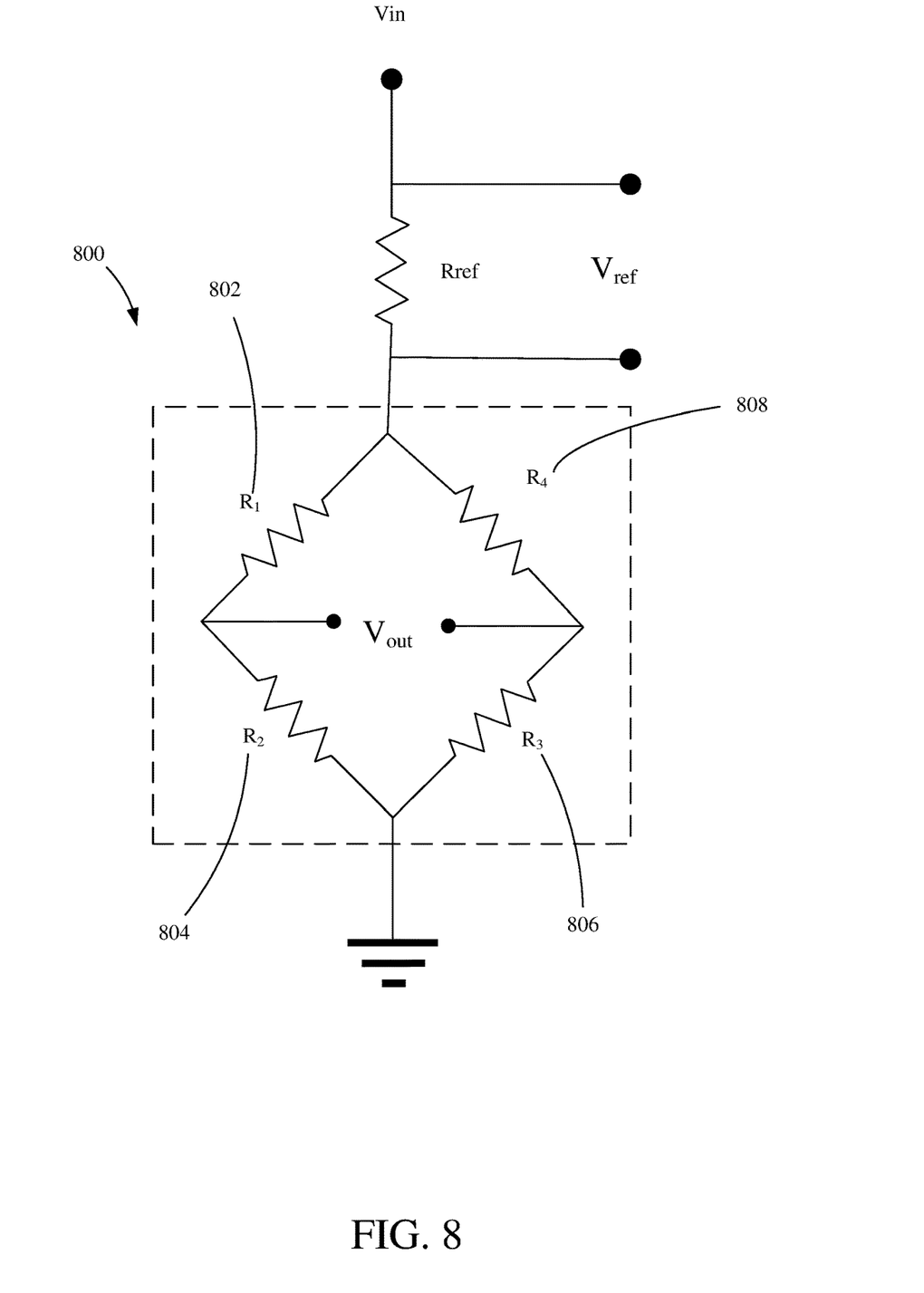
FIG. 8 is a schematic diagram of a multivariable sensor for implementation in a process fluid multivariable measurement system in accordance with an embodiment of the present invention.

FIG. 8 is a schematic diagram of a multivariable sensor for implementation in a process fluid multivariable measurement system in accordance with an embodiment of the present invention. Sensor 800 is generally configured to obtain one or more temperature measurements and/or one or more pressure measurements. In particular, sensor 800 may be configured to simultaneously obtain both pressure and temperature measurements in a process fluid multivariable measurement system. In one embodiment, sensor 800 is a strain-gauge sensor. As illustrated, sensor 800 includes resistors 802-808 which depend on both strain and temperature in their resistance. As temperature (correlating to $V_{ref}$) changes, resistors 802-808 change resistance in a similar direction and by a similar value. Further, as pressure (correlating to $V_{out}$) increases, resistors 802 and 806 increase in resistance by similar values while resistors 804 and 808 decrease in resistance by similar values. In this way, sensor 800 may simultaneously obtain pressure and temperature measurements within the process fluid measurement system.

Figure 9:
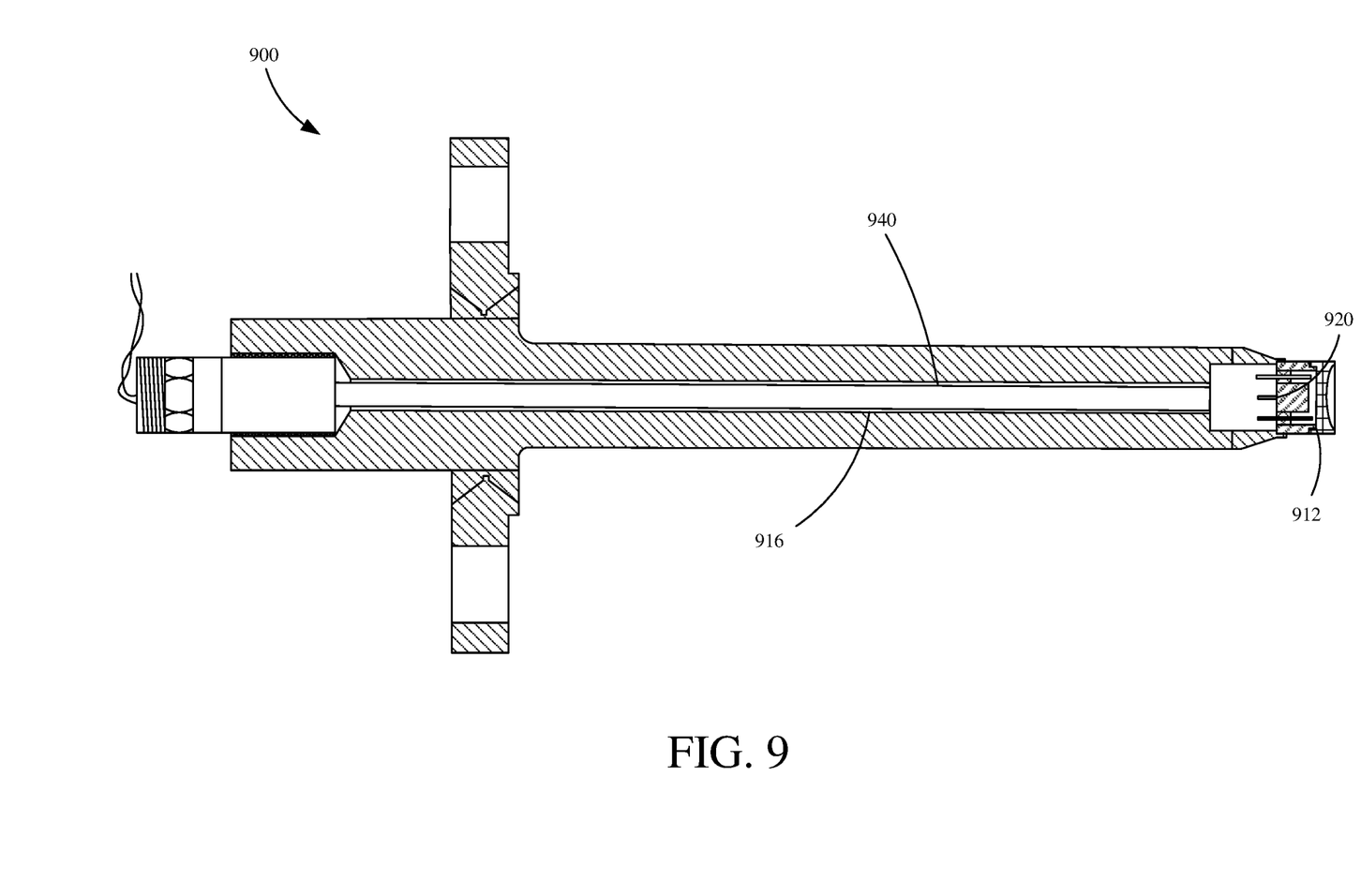
FIG. 9 is a diagrammatic view of a multivariable thermowell for implementation in a process fluid multivariable measurement system in accordance with another embodiment of the present invention.

FIG. 9 is a diagrammatic view of a multivariable thermowell for implementation in a process fluid multivariable measurement system in accordance with another embodiment of the present invention. The system illustrated in FIG. 9 bears some similarities to FIG. 1 and like components are numbered similarly. As illustrated, thermowell 900 is configured to couple to a process fluid conduit, such as the process fluid conduit described in FIGS. 5A-5B, and extend through a wall of the process fluid conduit. Thermowell 900 is further configured to generally contact process fluid within the process fluid conduit in order to obtain measurements of the process fluid, such as temperature and/or pressure. In one embodiment, thermowell 900 is a threaded thermowell. However, in other embodiments, thermowell 900 may be a flanged thermowell or other thermowell design capable of coupling to the process fluid conduit.

Thermowell 900 further includes multivariable sensor 920 generally disposed within sensor capsule 912 of thermowell 900. Sensor capsule 912 may include, for example, a multivariable sensor 920 that is similar to the multivariable sensor described above with regard to FIG. 8. In one embodiment, multivariable sensor 920 is a strain-gauge sensor. However, in other embodiments, a different type of multivariable sensor may be utilized. Multivariable sensor 920 is electrically connected to transmitter circuitry (not shown) via access hole 916 and is configured to obtain one or more temperature measurements and/or one or more pressure measurements. In particular, multivariable sensor 920 may be configured to simultaneously obtain both pressure and temperature measurements in a process fluid multivariable measurement system and responsively generate temperature and pressure sensor signals. Multivariable sensor 920 illustratively includes one or more multivariable sensitive elements generally disposed therein and configured to obtain one or more temperature and pressure measurements. Access hole 916 is generally configured to allow coupling 940 of multivariable sensor 920 therethrough. Multivariable sensor 920 may be electrically connected to transmitter circuitry, such as the circuitry described above with regard to FIG. 4, via a transmission loop, a fiber optic cable, a wireless link or some other connection. In operation, the transmitter circuitry may receive the temperature and pressure sensor signal from the at least one multivariable sensitive element and responsively generate a temperature and pressure measurement output based on the received sensor signals. By incorporating a multivariable sensor similar to that described above with regard to FIG. 8, both temperature and pressure of a process environment may be determined without the need for separate sensor assemblies.

Although the present invention has been described with reference to preferred embodiments, workers skilled in the art will recognize that changes may be made in form and detail without departing from the spirit and scope of the invention. For example, while embodiments of the present invention have been described with respect to a thermowell having pressure sensing capabilities, other process variable sensors could also be implemented in a thermowell, including, without limitation, flow, level, pH, vibration, and erosion.

What is claimed is:

1. A process fluid multivariable measurement system comprising:
   a thermowell configured to couple to a process fluid conduit and extend through a wall of the process fluid conduit;
   a temperature sensor assembly removably disposed within the thermowell, the temperature sensor assembly having at least one temperature sensitive element disposed therein;
   a pressure sensor assembly coupled to the thermowell, the pressure sensor assembly that is a having at least one pressure sensitive element disposed therein that is fluidically isolated from the process fluid conduit; and
   transmitter circuitry communicatively coupled to the temperature sensor assembly and the pressure sensor assembly, the transmitter circuitry configured to:
      receive a temperature sensor signal from the at least one temperature sensitive element and responsively generate a temperature measurement output based on the temperature sensor signal; and
      receive a pressure sensor signal from the at least one pressure sensitive element and responsively generate a pressure measurement output based on the pressure sensor signal;
      wherein the transmitter circuitry is configured to communicate the temperature measurement output and the pressure measurement output using a process communication protocol.

2. The process fluid multivariable measurement system of claim 1, wherein the pressure sensitive element comprises a capacitive pressure sensor configured to generate the pressure sensor signal in response to detected pressure within the process fluid conduit.

3. The process fluid multivariable measurement system of claim 1, wherein the transmitter circuitry is configured to couple to the pressure sensor assembly through an access hole of the thermowell.

4. The process fluid multivariable measurement system of claim 3, wherein the pressure sensitive element comprises a pressure deflecting diaphragm communicatively coupled to a pressure sensor, the pressure sensor disposed remotely from the thermowell.

5. The process fluid multivariable measurement system of claim 4, wherein the pressure deflecting diaphragm is communicatively coupled to the pressure sensor by a pressure transmitting substance disposed within the access hole.

6. The process fluid multivariable measurement system of claim 5, wherein the pressure transmitting substance is fluidically isolated from the process fluid conduit.

7. The process fluid multivariable measurement system of claim 3, wherein the access hole is disposed adjacent to the temperature sensor assembly.

8. The process fluid multivariable measurement system of claim 7, wherein the access hole is disposed parallel to the temperature sensor assembly.

9. The process fluid multivariable measurement system of claim 7, wherein the access hole is disposed within a wall of the thermowell.

10. A multivariable thermowell, comprising:
   a temperature sensor assembly removably mounted within the thermowell and having at least one temperature sensitive element disposed therein;
   a pressure sensor assembly having at least one pressure sensitive element disposed therein, the pressure sensitive element being configured to be fluidically isolated from a process fluid conduit; and
   an access hole disposed within the thermowell, the access hole configured to allow coupling of the pressure sensor assembly therethrough.

11. The multivariable thermowell of claim 10, wherein the access hole is disposed adjacent to the temperature sensor assembly.

12. The multivariable thermowell of claim 10, wherein the pressure sensor assembly is configured to couple to transmitter circuitry through the access hole of the thermowell.

13. The multivariable thermowell of claim 10, wherein the pressure sensitive element comprises a pressure deflecting diaphragm communicatively coupled to a pressure sensor disposed remotely from the multivariable thermowell.

14. The multivariable thermowell of claim 13, wherein the pressure deflecting diaphragm is communicatively coupled to the pressure sensor by a pressure transmitting substance disposed within the access hole.

15. A process fluid multivariable measurement system comprising:
   a thermowell configured to couple to a process fluid conduit and extend through a wall of the process fluid conduit;
   a temperature sensor assembly removably disposed within the thermowell, the temperature sensor assembly having at least one temperature sensitive element disposed therein;
   a multivariable sensor disposed within the thermowell, the multivariable sensor having at least one multivariable sensitive element disposed therein, the multivariable sensor being configured to be fluidically isolated from the process fluid conduit; and
   transmitter circuitry communicatively coupled to the temperature sensor assembly and the multivariable sensor, the transmitter circuitry configured to:
      receive a temperature sensor signal from the at least one temperature sensitive element and responsively generate a temperature measurement output based on the temperature sensor signal;
      receive a pressure sensor signal from the at least one multivariable sensitive element and responsively generate a pressure measurement output based on the pressure sensor signal; and
      receive an additional temperature sensor signal from the at least one multivariable sensitive element and responsively generate an additional temperature measurement output based on the additional temperature sensor signal.

16. The process fluid multivariable measurement system of claim 15, wherein the additional temperature sensor signal is configured to provide a backup temperature measurement.

* * * * *